F. F. ROWELL.
FLUID TIGHT JOINT.
APPLICATION FILED JAN. 20, 1913.

1,182,710.

Patented May 9, 1916.

UNITED STATES PATENT OFFICE.

FRANK F. ROWELL, OF MOUNT VERNON, NEW YORK, ASSIGNOR TO H. W. JOHNS-MANVILLE COMPANY, A CORPORATION OF NEW YORK.

FLUID-TIGHT JOINT.

1,182,710.  Specification of Letters Patent.  Patented May 9, 1916.

Original application filed November 12, 1912, Serial No. 731,379. Divided and this application filed January 20, 1913. Serial No. 743,197.

*To all whom it may concern:*

Be it known that I, FRANK F. ROWELL, a citizen of the United States of America, residing at Mount Vernon, county of Westchester, State of New York, have invented certain new and useful Improvements in Fluid-Tight Joints, of which the following is a specification.

My invention relates to modern plumbing apparatus and comprises an improved construction of a joint or connection between an earthenware structure and a metal tube such as a supply or waste pipe, this application constituting a division of my prior application filed November 12, 1912, Serial No. 731,379.

In designing the more modern styles of plumbing apparatus the effort is now made to do away with all exposed metal fittings on the upper and outer surfaces. In the case of lavatories and the like structures this requires the use of delivery ducts formed in the porcelain or other earthenware material of which they are composed. To these ducts the iron pipes bringing water from the source of supply must be joined by connections which will remain fluid tight in spite of the unequal rates of expansion and contraction under heat possessed by the metal and earthenware, as the differences of temperature to which the parts are exposed are considerable, in the case of the hot water connection, for instance. The ordinary screwed or cemented connections will not serve the purpose because of the rigidity of the parts and for other reasons. I have invented a form of joint which overcomes these difficulties and can be most conveniently operated to connect an iron or other metal pipe with an earthenware fixture like a lavatory or to disconnect it at any time.

The best form of apparatus embodying my invention at present known to me is illustrated in the accompanying sheet of drawings in which,—

Figure 1:
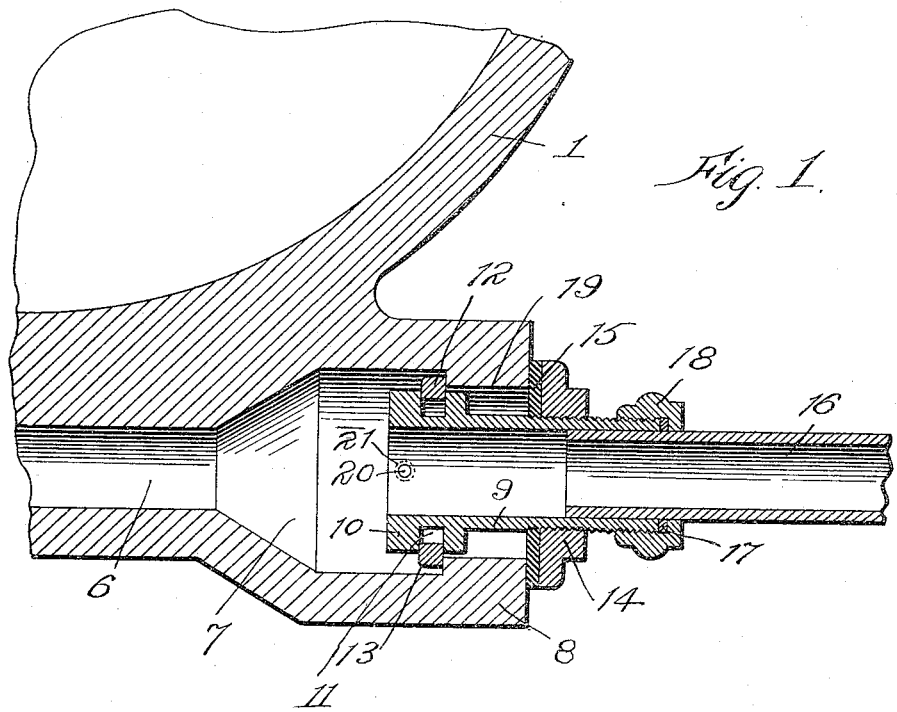
Figure 2:
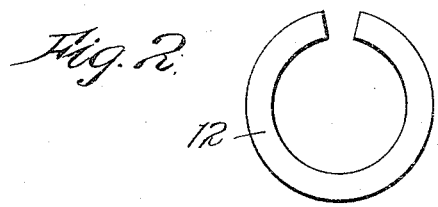

Figure 1 is a central section through the end of a pipe and the coöperating parts of a lavatory, parts being broken away, and Fig. 2 is a detail of the spring ring which constitutes the preferred form of an important element in the combination.

Throughout the drawings like reference characters indicate like parts.

1 indicates a portion of a lavatory bowl, in the wall of which is formed a conduit or water supply channel 6. Said channel has an enlargement 7, forming a chamber at its end, which enlarged chamber has the rear wall 8, perforated as at 19, to receive a thimble or short section of pipe 9, which serves as an extension of feed pipe proper 16. This nipple or thimble has an enlargement or head 10 formed by thickening the walls and in the outer circumference of such enlargement is formed the groove 11. In this groove 11 fits spring ring or washer 12 which normally expands radially, as shown in the drawings. The front face of this spring ring 12 is slightly chamfered off, as shown at 13. The other end of the nipple or thimble 9 has an exterior screw thread with which a nut 14 engages. 15 is a thick washer of india rubber or other waterproof elastic material placed inside of the nut. The pipe 16 may be connected to this thimble 9 in any convenient way, as by slipping it into the outer end of said nipple, as shown, and then making the connection water-tight by screwing on the hollow nut or cap 18, which forces the packing ring 17 against the end of the nipple 9 and against the exterior of the pipe 16.

To prevent the thimble 9 from turning when nut 14 is screwed on, I place a small pin 20 in a radial perforation in the head 10 and form a small recess 21 in the bottom of each chamber 7, so that when the thimble is turned so that the pin 20 comes over recess 21, it will drop into the same and prevent the thimble from turning farther.

In assembling the parts the spring ring 12 is placed in the groove 11 and compressed with the fingers or otherwise so as to permit it to be slipped into the perforation 19 and then the thimble is thrust in until said ring passes through the perforation 19 in wall 8, whereupon it expands into the position shown in Fig. 1, and so prevents the withdrawal of the nipple. The elastic washer 15 and nut are then placed in position and screwed up hard against the exterior of the end wall 8, and the pipe connection made to said nipple.

By using porcelain covered valves with porcelain covered tops (not shown) I am thus enabled to produce a lavatory which has no metal exposed, thus preventing the collection of verdigris and rust which occur with devices now in use, and yet by reason of the improved joint above described, the connections between the metal water supply pipes and the channels in the earthenware lavatory are always maintained water-tight. By this construction all the joints between the fixture and the pipes are placed in hidden compartments of the fixture.

Having, therefore, described by invention, I claim:

1. A coupling for plumbing fixtures comprising a fixture member having an opening therein, a coupling member one end of which is compressible for insertion through the opening and self expanding thereafter to a diameter greater than the opening, and means for drawing the inserted end of the coupling member to a bearing and maintaining it in clamped relation against the inner side of the wall around the opening.

2. A coupling member for plumbing fixtures comprising a fixture member having an opening therein, a coupling member one end of which is insertible through the opening and provided with an annular groove, a resilient ring in the groove, the said ring being compressible for insertion with the coupling member and self expanding to a diameter greater than the said opening, and means for drawing the ring to a bearing and maintaining it in clamped relation against the inner side of the wall around the opening.

3. A coupling member for plumbing fixtures comprising a fixture member having an opening therein, a coupling member one end of which is insertible through the opening and provided with an annular groove, a spring metal ring in the groove normally of greater diameter than the said opening, the ring being compressible for insertion with the coupling member through the opening and self expanding thereafter to its normal diameter, and means for drawing the ring to a bearing and maintaining it in clamped relation against the inner side of the wall around the opening.

4. A coupling member for plumbing fixtures comprising a fixture member having an opening therein, a coupling member one end of which is insertible through the opening and provided with an annular groove, a spring metal ring in the groove normally of greater diameter than the said opening, the ring being compressible for insertion with the coupling member through the opening and self expanding thereafter to its normal diameter, a nut threaded on the outer end of the coupling member for drawing the ring to a bearing against the inner side of the wall around said opening, and a gasket interposed between the nut and the outer wall of the fixture member.

5. The combination with an earthenware fixture having a passageway formed in the wall thereof and terminating at the exterior in an annular inwardly extending shoulder, of a metal pipe having an enlarged head of slightly less diameter than said opening, an annular groove in said head and a radially expansible ring seated in the groove normally of a diameter greater than the opening through the wall, but capable of compression to a diameter less than said opening, and said pipe having an exteriorly threaded body with a clamping nut of greater diameter than the opening in the wall mounted thereon.

FRANK F. ROWELL.

Witnesses:
W. W. FROTHINGHAM,
THOMAS E. SHEA.

Copies of this patent may be obtained for five cents each, by addressing the "Commissioner of Patents, Washington, D. C."